US012660826B1

(12) United States Patent
Mahmudov et al.

(10) Patent No.: US 12,660,826 B1
(45) Date of Patent: Jun. 23, 2026

(54) HYDROGEN NANOBUBBLES INFUSED WATER FOR INDUSTRIAL CROP IRRIGATION

(71) Applicants: American Air Liquide, Inc., Fremont, CA (US); L'Air Liquide, Societe Anonyme pour l'Etude et l'Exploitation des Proceoes Georges Claude, Paris (FR)

(72) Inventors: Rovshan Mahmudov, Newark, DE (US); Shu Fang, Newark, DE (US); Daniel Duarte, Newark, DE (US); Yan Zeng, Zhuan Qiao (CN)

(73) Assignee: L'Air Liquide, Société Anonyme pour l'Etude et l'Exploitation des Procéés Georges Claude, Paris (FR)

( * ) Notice: Subject to any disclaimer, the term of this patent is extended or adjusted under 35 U.S.C. 154(b) by 753 days.

(21) Appl. No.: 17/473,944

(22) Filed: Sep. 13, 2021

Related U.S. Application Data

(60) Provisional application No. 63/077,762, filed on Sep. 14, 2020.

(51) Int. Cl.
A01N 59/00 (2006.01)
A01G 22/00 (2018.01)

(52) U.S. Cl.
CPC ............. *A01N 59/00* (2013.01); *A01G 22/00* (2018.02)

(58) Field of Classification Search
CPC .... A61K 31/352; A61K 36/00; A61K 36/185; A61K 9/006; A61K 9/7023; A61K 2236/00; A61K 31/05; A61K 2236/37
See application file for complete search history.

(56) References Cited

U.S. PATENT DOCUMENTS

| | | | | |
|---|---|---|---|---|
| 7,670,495 | B2 * | 3/2010 | Senkiw | A01K 63/042 |
| | | | | 210/600 |
| 8,122,637 | B2 | 2/2012 | Blotsky | |
| 8,794,604 | B2 * | 8/2014 | Ryu | B01F 23/23123 |
| | | | | 261/122.1 |
| 2008/0290045 | A1 | 11/2008 | Robinson et al. | |
| 2015/0096230 | A1 * | 4/2015 | Ankner | A01G 22/00 |
| | | | | 47/59 R |
| 2016/0088809 | A1 | 3/2016 | Lowe et al. | |
| 2016/0151525 | A1 | 6/2016 | Kleinberger et al. | |
| 2017/0135295 | A1 | 5/2017 | Laurenzi | |
| 2021/0337833 | A1 | 11/2021 | Liu et al. | |

FOREIGN PATENT DOCUMENTS

| | | |
|---|---|---|
| CN | 102657221 | 9/2012 |
| CN | 206494303 | 9/2017 |
| CN | 206612119 | 11/2017 |
| CN | 108901763 | 11/2018 |
| CN | 110367426 | 10/2019 |
| EP | 3 190 091 | 7/2017 |
| KR | 101989021 | 6/2019 |
| WO | WO 01 008493 | 2/2001 |

OTHER PUBLICATIONS

"Hemp Hydroponics 101" ("Hemp Hydroponics 101: A Guide on How to Do It Correctly.", What is Hemp, Aug. 16, 2020, https://whatishemp.com/blog/hemp-hydroponics-101-a-guide-on-how-to-do-it-correctly/, (Year: 2020).*

Chen, Q. et al., Hydrogen-rich water pretreatment alters photosynthetic gas exchange, chlorophyll fluorescence, and antioxidant activities in heat-stressed cucumber leaves, J. Plant Growth Regul (2017) 83:69-82.

Cui, W. et al., Alleviation of cadmium toxicity in *Medicago sativa* by hydrogen-rich water, Journal of Hazardous Materials 260 (2013) 715-724.

Cui, W. et al., Hydrogen-rich water confers plant tolerance to mercury toxicity in alfalfa seedlings, Ecotoxicology and Environmental Safety 105 (2014) 103-111.

Dai, C. et al., Proteomic analysis provides insights into the molecular bases of hydrogen gas-induced cadmium resistance in *Medicago sativa*, Journal of Proteomics 152 (2017) 109-120.

Hu, H. et al., Hydrogen gas prolongs the shelf life of kiwifruit by decreasing ethylene biosynthesis, Postharvest Biology and Technology 135 (2018) 123-130.

Hu, H. et al., Hydrogen-rich water delays postharvest ripening and senescence of kiwifruit, Food Chemistry 156 (2014) 100-109.

Jin, Q. et al., Hydrogen gas acts as a novel bioactive molecule in enhancing plant tolerance to paraquat-induced oxidative stress via the modulation of heme oxygenase-1 signalling system, Plant, Cell & Environment (2013) 36, 956-969.

Jin, Q. et al., Hydrogen-modulated stomatal sensitivity to abscisic acid and drought tolerance via the regulation of apoplastic pH in *Medicago sativa*, J. Plant Growth Regul (2016) 35:565-573.

Lim, S.T. et al., Genetic engineering in agriculture- hydrogen uptake (hup) genes, TIBS, Jun. 1980, 167-170.

Lin, Y. et al., Hydrogen-rich water regulates cucumber adventitious root development in a heme oxygenase-1carbon monoxide-dependent manner, Journal of Plant Physiology 171 (2014) 1-8.

Liu, S. et al., Antioxidant activity of hydrogen nanobubbles in water with different reactive oxygen species both in vivo and in vitro, Langmuir 2018, 34, 11878-11885.

Molecular Hydrogen Institute, Concentration and solubility of $H_2$, downloaded on Jun. 2, 2020 from URL http://www.molecularhydrogeninstitute.com/concentration-and-solubility-of-h2, 4 pages.

Ohsawa, I. et al., Hydrogen acts as a therapeutic antioxidant by selectively reducing cytotoxic oxygen radicals, Nature Medicine, vol. 13, No. 6, Jun. 2007, 688-694.

Ren, A. et al., Hydrogen-rich water regulates effects of ROS balance on morphology, growth and secondary metabolism via glutathione peroxidase in *Ganoderma lucidum*, Environmnental Microbiology (2017) 19(2), 566-583.

(Continued)

*Primary Examiner* — Audrea B Coniglio
(74) *Attorney, Agent, or Firm* — Yan Jiang

(57) ABSTRACT

A method for irrigating a crop using a nanobubble hydrogen rich water to increase a concentration of tetrahydrocannabinol (THC) in the crop is disclosed.

10 Claims, 11 Drawing Sheets

(56) References Cited

OTHER PUBLICATIONS

Shen, W. et al., Research progress in the botanical effects of hydrogen gas, Journal of Nanjing Agricultural University, 2018, 41(3): 392-401, Chinese with English Abstract.

Su, N. et al., Hydrogen-rich water reestablishes ROS homeostasis but exerts differential effects on anthocyanin synthesis in two varieties of radish sprouts under UV-A, J. Agric. Food Chem. 2014, 62, 6454-6462.

Wang, Y. et al., Linking hydrogen-mediated boron toxicity tolerance with improvement of root elongation, water status and reactive oxygen species balance, Annals of Botany 188: 1279-1291, 2016.

whatishemp.com, Hemp hydroponics 101: a guide on how to do it correctly, What is Hemp, Aug. 16, 2020, https://whatishemp.com/blog/hemphydroponics-101-a-guide-on-how-to-do-it-correctly/, 3 pages.

Wu, Q. et al., Cadmium-induced hydrogen accumulation is involved in cadmium tolerance in *Brassica campestris* by reestablishment of reduced glutathione homeostasis, PLoS ONE 10(10): e0139956, Oct. 7, 2015, 1-21.

Wu, Q. et al., Hydrogen-rich water enhances cadmium tolerance in Chinese cabbage by reducing cadmium uptake and increasing antioxidant capacities, Journal of Plant Physiology 175 (2015) 174-182.

Xie, Y. et al., '$H_2$ enhances arabidopsis salt tolerance by manipulating zat10/12-mediated antioxidant defence and controlling sodium exclusion, PLoS ONE7(11): e49800, Nov. 2012, 1-11.

Xie, Y. et al., Hydrogen-rich water-alleviated ultraviolet-B-triggered oxidative damage is partially associated with the manipulation of the metabolism of (iso)flavonoids and antioxidant defence in *Medicago sativa*, Functional Plant Biology, 2015, 42, 1141-1157.

Xie, Y. et al., Reactive oxygen species-dependent nitric oxide production contributes to hydrogen-promoted stomatal closure in Arabidopsis, Plant Physiology, Jun. 2014, vol. 165, 759-773.

Xu, S. et al., Hydrogen enhances adaptation of rice seedlings to cold stress via the reestablishment of redox homeostasis mediated by miRNA Expression, Plant Soil (2017) 414:53-67.

Xu, S. et al., Hydrogen-rich water alleviates salt stress in rice during seed germination, Plant Soil (2013) 370:474-57.

Xu, D. et al., Linking hydrogen-enhanced rice aluminum tolerance with the reestablishment of GA/ABA balance and miRNA-modulated gene expression: a case study on germination, Ecotoxicology and Environmental Safety 145 (2017) 303-312.

Zeng, J. et al., Molecular hydrogen is involved in phytohormone signaling and stress responses in plants, PLoS ONE 8(8): e71038, Aug. 2013, 1-10.

Zeng, J. et al., Progress in the study of biological effects of hydrogen on higher plants and its promising application in agriculture, Medical Gas Research 2014, 4:15.

Zhang, J. et al., Hydrogen-rich water alleviates the toxicities of different stresses to mycelial growth in *Hypsizygus marmoreus*, AMB Express (2017) 7:107, 1-11.

Zhang, X. et al., Protective effects of hydrogen-rich water on the photosynthetic apparatus of maize seedlings (*Zea mays* L.) as a result of an increase in antioxidant enzyme activities under high light stress, Plant Growth Regul (2015) 77:43-56.

International Search Report and Written Opinion for related PCT/US2021/050131, Jan. 20, 2022.

* cited by examiner

HYDROGEN NANOBUBBLES INFUSED WATER FOR INDUSTRIAL CROP IRRIGATION

CROSS REFERENCE TO RELATED APPLICATIONS

The present application claims the benefit of U.S. provisional patent application No. 63,077,762 filed Sep. 14, 2020, being incorporated herein by reference in its entirety for all purposes.

FIELD OF THE INVENTION

The present invention relates to methods and processes for producing hydrogen rich water (HRW) and methods for using the same for irrigation of industrial crops, in particular, for irrigation of industrial crops such as cannabis, maize, crops used for production of essential oils (e.g., lavender, oilseed rape, linseed) and fiber (e.g., coir, cotton, flax).

BACKGROUND

Studies have shown that molecular hydrogen possesses unique properties that benefit agricultural productions. For example, Lim et al, "Genetic engineering in agriculture: hydrogen uptake (hup) genes", Trends in biochemical sciences, 5(6), 167-170, 1980; Zeng et al, "Progress in the study of biological effects of hydrogen on higher plants and its promising application in agriculture", Medical Gas Research, 4(1), 15, 2014); Hu et al, "Hydrogen-rich water delays postharvest ripening and senescence of kiwifruit", Food chemistry, 156, 100-109, 2014; Zhang et al, "Protective effects of hydrogen-rich water on the photosynthetic apparatus of maize seedlings (*Zea mays* L.) as a result of an increase in antioxidant enzyme activities under high light stress", *Plant growth regulation,* 77(1), 43-56, 2015; Wang et al, "Linking hydrogen-mediated boron toxicity tolerance with improvement of root elongation, water status and reactive oxygen species balance: a case study for rice", *Annals of botany,* 118(7), 1279-1291, 2016. There are large potentials of using hydrogen gas in agriculture irrigation processes, which may improve agriculture yields, change growth periods, to enhance resistance to diseases and reduce the use of pesticides. However, due to the limited solubility of hydrogen in water, conventional gas injection methods need to be modified. Nanobubbles are extremely small gas bubbles with large surface area to volume ratio. The larger surface area allows for increased mass transfer. Hence, the concerns of low solubility of $H_2$ and fast degradation of dissolved $H_2$ in water may be resolved by applying the nanobubbles.

Hydrogen is a strong reducing agent. Zhang et al, "Hydrogen-rich water alleviates the toxicities of different stresses to mycelial growth in *Hypsizygus marmoreus*", *AMB Express,* 7(1), 107, 2017 discloses hydrogen enhances the antioxidant activities and decrease the reactive oxygen species (ROS) level in mycelia. Liu et al, "Antioxidant activity of hydrogen nanobubbles in water with different reactive oxygen species both in vivo and in vitro", *Langmuir,* 34(39), 11878-11885, 2018 disclosed nanobubbles enhanced the antioxidant capacity of hydrogen water and nanobubbles hydrogen water can remove ROS ($^-OH$, $ClO^-$, $ONOO^-$ and $O2^{'-}$) from water. Zeng et al, "Molecular hydrogen is involved in phytohormone signaling and stress responses in plants", *PLoS ONE,* 8(8), 2013 discloses hydrogen may also induce antioxidant enzyme gene expression. Zeng et al. suggested that hydrogen might be an important signaling molecule, which may participate in the regulation of plant hormone signaling pathways involved in plant growth and stress adaptation. Jin et al, "Hydrogen gas acts as a novel bioactive molecule in enhancing plant tolerance to paraquat-induced oxidative stress via the modulation of heme oxygenase-1 signaling system", *Plant, Cell & Environment,* 36(5), 956-969, 2013 suggested hydrogen alleviates paraquat-induced oxidative stress via modulation of heme oxygenase-1 (HO-1) signaling. Ohsawa et al, "Hydrogen acts as a therapeutic antioxidant by selectively reducing cytotoxic oxygen radicals", *Nature medicine,* 13(6), 688-694, 2007 discloses hydrogen also acts as therapeutic antioxidant by selectively reducing cytotoxic oxygen radicals.

WO01/08493A1 to Scribner et al. discloses a method to enhance plant growth or yield (increased dry weights by 10-30%) by exposing soil to hydrogen gas (5% to 100%). Hydrogen may be generated by water electrolysis, electrical current, or $H_2$ evolving microorganisms, which generate hydrogen directly in the soil.

US2017/0135295A1 to Laurenzi et al. discloses a method to improve growth rate of plants, health of plants, and plant yield by using structured micro-water for irrigation. The dissolved hydrogen ranges from 0.01 to 10 ppm. The micro-water is generated by electrolysis/ionization or addition of chemicals, and is easier for a plant to absorb through the plant's aquaporins.

EP3190091A1 to Ishikawa et al. discloses apparatus to generate hydrogen enriched water for agriculture usage via electrolyzing water. The invention claimed that positively charged water with enhanced hydrogen bonds may reduce the oxidation of the cell walls of plant roots, and hence strengthening roots.

CN108901763A to Li et al. discloses a device of hydrogen nanobubbles generator with features of adjustable hydrogen concentration for agriculture irrigation. Hydrogen was generated by electrolysis. The adjustable hydrogen concentration was controlled by tandeming multiple electrolytic cells.

KR101989021B1 to Sun et al. discloses a device to generate hydrogen enriched water for agriculture, stock-breeding and seafood areas. The high hydrogen concentration water was produced by increasing the hydrogen dissolution rate in the pretreating water.

CN110367426A to Liu et al. discloses an invention of hydrogen nanobubbles generation equipment using ultrasound and electrode. The nanobubbles generated may range from 20-1000 nm. The expected dissolved hydrogen concentration may reach 3-6 ppm. The equipment was used for generating hydrogen enriched beverages with anti-oxidizing and antibacterial properties.

CN102657221B to Shen et al. discloses a method to prepare and apply a HRW to regulate plants growth, in which the HRW ranging from 0.1-100% is prepared through water electrolysis, chemical reaction, fermentation or gas cylinders. The application areas include plant irrigate, spray, immersion or seed soaking for plants including plant, inflorescence, fruit or plant tissues of monocotyledon, dicotyledon or seed gymnosperms.

CN206494303U to Shen et al. discloses a design of a portable kettle which can produce hydrogen-rich-water for maintaining the moisture and increasing shelf life of vegetables and flowers in daily life. The hydrogen-rich-water was produced by an electrolytic device at the base of the kettle.

CN206612119U to Shen et al. discloses a design of a reservation box which can spray the produced hydrogen-rich-water to fruit and vegetables to increase shelf life. The hydrogen-rich-water was generated by an electrolytic device inside the reservation box and the concentration can be monitored and adjusted.

SUMMARY

There is disclosed a method for irrigation of a crop capable of producing tetrahydrocannabidiol (THC), the method comprising:

irrigating the crop with a nanobubble hydrogen rich water (HRW-nano), whereby a concentration of THC in the crop increased as a result of irrigating with the HRW-nano, compared to irrigation with an irrigation water having the same composition except without added hydrogen (control irrigation).

In some embodiments, the method further comprises the steps of pumping a feed water to a nanobubble generator; and injecting the hydrogen gas into the nanobubble generator to form the hydrogen nanobubbles in water therein, wherein a flow rate of hydrogen gas and a flow rate of water fed to the nanobubble generator are controlled to achieve consistent hydrogen nanobubble sizes.

In some embodiments, the consistent average hydrogen nanobubble sizes range, for the maximum diameter of linear cross length distance, from approximately 20 to approximately 1000 nm, preferably less than approximately 200 nm.

In some embodiments, the consistent average hydrogen nanobubble size is, for the maximum diameter of linear cross length distance, preferably less than approximately 200 nm.

In some embodiments, a concentration of disclosed hydrogen in the disclosed HRW ranges from approximately 0.1 to 1.6 mg/L.

In some embodiments, a concentration of dissolved hydrogen in the HRW is from approximately 0.6 mg/L to approximately 1.00 mg/L.

In some embodiments, a concentration of dissolved hydrogen in the HRW is approximately 0.8 mg/L.

In some embodiments, the crops are plants of the Family Cannabaceae.

In some embodiments, the crops are plants of the Genus *Cannabis* L.

In some embodiments, the crops include one or more of the following: cannabis (e.g., hemp, marijuana), maize, crops used for production of essential oils (e.g., lavender, oilseed rape, linseed) and fiber (e.g., coir, cotton, flax).

In some embodiments, the crop is cannabis.

In some embodiments, the concentration of tetrahydrocannabinol (THC) is increased up to approximately 32% by irrigating with the HRW-nano compared to control irrigation.

In some embodiments, the nanobubble generator is a device capable of producing the hydrogen nanobubbles in water with an average hydrogen nanobubble size of approximately 20 to approximately 1000 nm, preferably less than approximately 200 nm.

In some embodiments, the nanobubble generator is a centrifugal or turbine pumped gas mixing device or a ceramic diffuser with appropriate surface coating.

In some embodiments, the crop is cultivated and the resulting cultivated crop is increased in average size or weight compared to a cultivated crop that was not irrigated with HRW.

In some embodiments, the crop is cultivated and the resulting cultivated crop is increased in average size or weight compared to a cultivated crop that was not irrigated with HRW-nano.

Notation and Nomenclature

The following detailed description and claims utilize a number of abbreviations, symbols, and terms, which are generally well known in the art, and include:

As used herein, the indefinite article "a" or "an" should generally be construed to mean "one or more" unless specified otherwise or clear from context to be directed to a singular form.

As used herein, "about" or "around" or "approximately" in the text or in a claim means ±10% of the value stated.

As used herein, "close to" or "nearly" in the text or in a claim means within 10% of the term stated. For example, "close to saturated concentration" refers to within 10% of saturated concentration.

The term "HRW-nano" refers to water containing hydrogen produced by hydrogen nanobubble injection. The HRW-nano has a concentration of dissolved hydrogen ranging from approximately 0.1 ppm to approximately 1.6 ppm. The dissolved hydrogen in the HRW-nano will remain at the target concentration in solution for several hours, e.g., up to 8 hours.

The term "HRW-regular" refers to water containing hydrogen produced by conventional hydrogen gas injections, e.g., using diffuser and Venturi injection systems. The HRW-regular has a concentration of dissolved hydrogen ranging from approximately 0.1 ppm to approximately 1.6 ppm. The dissolved hydrogen in the HRW-regular will remain at the target concentration in solution up to 4 hours.

The term "feed water" refers to a common irrigation water and/or nutrition medium, such as, fresh surface water, tap water, ground water, effluent water, wastewater already treated by a tertiary treatment process to meet irrigation requirements (e.g., California requires advanced physical-chemical treatment and extended disinfection to meet a coliform standard less than 2/100 mL), or the like.

The term "biomass yield" or "yield" refers to the dry weight of the whole plant including stems, leaves, and buds.

The term "floral mass" refers to the dry weight of buds and leaves.

The term "true leaves" refers to the leaves having 5 to 7 end points.

The term "optimal or consistent" refers to a certain concentration of dissolved gas in the liquid, which is stable at atmospheric conditions and would not degas within a short period, that is, a few hours to up to one or two days.

Reference herein to "some embodiments" or "an embodiment" means that a particular feature, structure, or characteristic described in connection with the embodiment may be included in at least some embodiments of the invention. The appearances of the phrase "in some embodiments" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

"Comprising" in a claim is an open transitional term, which means the subsequently identified claim elements are a nonexclusive listing i.e. anything else, may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints, i.e., x=1 to 4 or x ranges from 1 to 4 includes x=1, x=4, and x=any number in between, irrespective of whether the term "inclusively" is used.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE PREFERRED EMBODIMENTS

Figure 1:
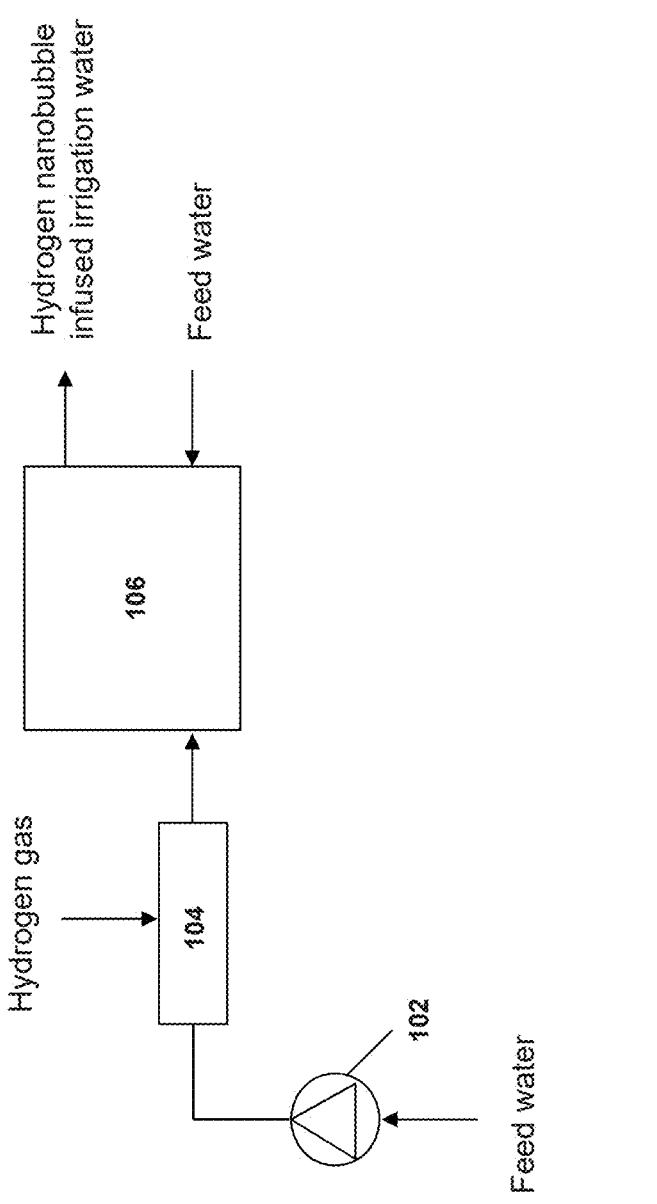
FIG. 1 is a block diagram of an exemplary embodiment for generation of hydrogen rich water (HRW) or hydrogen rich irrigation water.

Disclosed are methods for producing a hydrogen rich irrigation water or hydrogen rich water (HRW) for irrigation using hydrogen nanobubble injection and methods for using the same to irrigate crops or plants, such as industrial crops and/or edible crops. The disclosed HRW is "HRW-nano" referring to a water containing dissolved hydrogen or a hydrogen rich water produced by hydrogen nanobubble injections. In contrast, a "HRW-regular" is used here to represent a HRW generated by conventional hydrogen gas injections, i.e., diffuser and Venturi injection systems. The disclosed HRW-nano generally has a concentration of dissolved hydrogen ranging from approximately 0.1 ppm to a maximum of 1.4 ppm. The dissolved hydrogen in the HRW-nano is expected to stay in the HRW at least 8 hours. The dissolved hydrogen in the HRW-regular is expected to stay in the HRW for approximately 4 hours.

Here, the industrial crops include plants of the Family Cannabaceae and plants of the Genus *Cannabis* L, such as *Cannabis* (e.g., hemp), maize, crops used for production of essential oils (e.g., lavender, oilseed rape, and linseed), fiber (e.g., coir, cotton, and flax), or the like. *Cannabis* is used herein as an exemplary industrial crop.

The industrial crops may be grow outdoors, such as open fields, or indoors, such as a greenhouse.

There are quite a few different ways to grow *cannabis*, with cultivation taking place either outdoors or indoors, e.g., a greenhouse. After selecting seeds or clones of the *Cannabis* strain desired, one of the following, basic *Cannabis* growing methods may be selected.

Soil cultivation may be done outdoors or indoors (e.g., potted plant in a greenhouse). Growing *Cannabis* in soil outdoors, that is, open fields, is the easiest and least expensive method. Indoors planting may be done by hydroponics cultivation and aeroponic cultivation. Hydroponic cultivation involves growing plants without soil by using mineral nutrient solutions in an aqueous solvent. In such a system, plant roots are exposed to the nutritious liquid, or, in addition, the roots may be physically supported by an inert medium such as perlite, gravel, or other substrates. The nutrients used in hydroponic systems can come from many different sources, including fish excrement, duck manure, purchased chemical fertilizers, or artificial nutrient solutions. Aeroponic cultivation involves growing the roots of the plant in air rather than soil, gravel, or any other medium. Typically, the plant is nestled in a mesh basket and a continuous mist of water and fertilizers is spayed over the hanging roots.

Hydroponic growing is more expensive than traditional soil methods. Growers will need to purchase the pumps, containers, reservoirs, and gravel before projects begin. This method also requires quite a bit more work for the grower, as the levels of nutrients, as well as pH balance will need to be consistently managed.

In some embodiments, the disclosed HRW is a hydrogen nanobubble (HRW-nano) containing water that enhances crop productions and increases the concentration of main compounds in the industrial crops. For instance, the HRW—nano, enhances hemp cultivation and increases the concentration of the compound Tetrahydrocannabinol (THC) in *Cannabis*.

The disclosed HRW may have a concentration of dissolved hydrogen in water from approximately 0.1 mg/L to approximately 1.6 mg/L. The saturation concentration of hydrogen in pure water is 1.95 and 1.60 mg/L at P=1 bar and T=273.1 K and T=298.1 K, respectively (Yong, C. L, 1981. Solubility Data Series, Volume 5/6, Hydrogen and Deuterium). Preferably, the concentration of disclosed hydrogen in the disclosed HRW ranges from approximately 0.1 to 1.6 mg/L. More preferably, the concentration of dissolved hydrogen in the HRW is from approximately 0.6 mg/L to approximately 1.00 mg/L. Even more preferably, the concentration of disclosed hydrogen in the disclosed HRW is approximately 0.8 mg/L or 0.8 ppm. The gaseous hydrogen was injected into the water in the form of nanobubbles from a nanobubble generator. A flow rate of hydrogen gas and a flow rate of water fed to the nanobubble generator may be controlled to achieve optimal and consistent average nanobubble sizes of 20 to 1000 nm, preferably less than approximately 200 nm, for the maximum diameter of linear cross length distance. It is known that it is difficult to inject hydrogen gas into water considering the low solubility of hydrogen in water with Henry's law constant of $K_H^\circ=7.8\times10^{-4}$ mol/kg-bar for hydrogen at 273K (NIST Chemistry WebBook).

By infusing the irrigation water with hydrogen nanobubbles under atmosphere conditions as disclosed herein, hydrogen degassing is significantly reduced. The hydrogen nanobubbles are very stable and may stay in water for a long period. For example, once target concentration is achieved, the hydrogen nanobubbles may stay in water for at least 8 hours. This quality of remaining stable in water may help hydrogen gas eliminate its low solubility problems and high fugacity problems during hydrogen injection and irrigation processes. Small buoyancy force and small Brownian motion force acting on bubbles that have an average size of 20 to 1000 nm, preferably less than 200 nm, resulting in the bubbles (i.e., nanobubbles) increased stability in water.

The disclosed method preferably uses nanobubble generators to create hydrogen nanobubbles in irrigation water that increases the lifetime of dissolved hydrogen in water and eliminates the need of using high pressure devices to achieve the required level of dissolved hydrogen. In the disclosed method, the concentration of dissolved hydrogen in the produced irrigation water is preferably at least 0.8 mg/L for optimum growth enhancement of crops.

FIG. 1 is a block diagram of an exemplary embodiment for generation of HRW or hydrogen rich irrigation water. As shown, a feed water, pumped by a feed water pump 102, and hydrogen gas is fed to a nanobubble generator 104, where hydrogen nanobubbles in water are generated. A water tank 106 downstream of the nanobubble generator 104 receives hydrogen nanobubbles in water and produces a hydrogen nanobubble infused irrigation water, that is, the HRW-nano therein for irrigation of crops or plants. The feed water used herein includes common irrigation water and/or nutrition medium, such as, fresh surface water, tap water, ground water, effluent water, wastewater already treated by a tertiary treatment process to meet irrigation requirements (e.g., California requires advanced physical-chemical treatment and extended disinfection to meet a coliform standard less than 2/100 mL), or the like. The feed water pump 102 may be a centrifugal pump. The water tank 106 may be any commercially available water tank that can be used at ambient condition.

Figure 2:
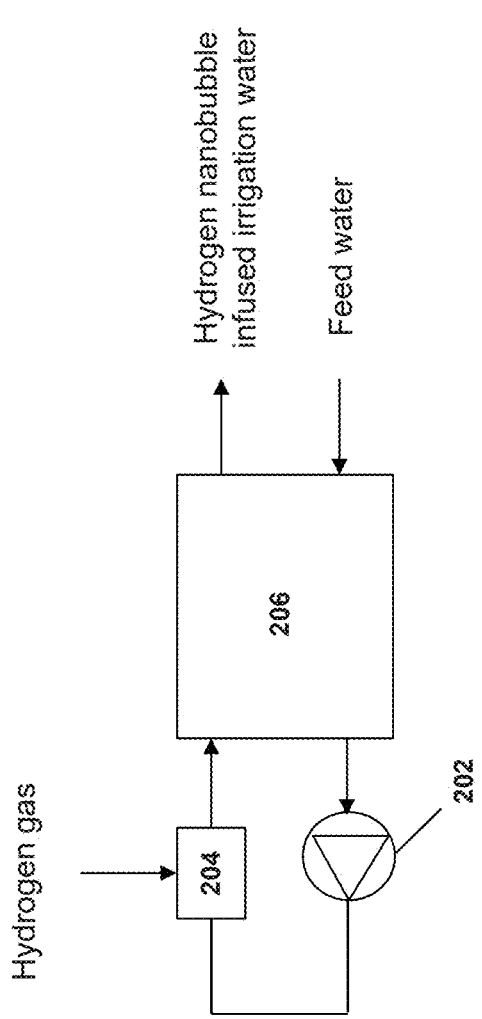
FIG. 2 is a block diagram of alternative exemplary embodiment for generation of HRW or hydrogen rich irrigation water.

FIG. 2 is a block diagram of alternative exemplary embodiment for generation of hydrogen rich water or hydrogen rich irrigation water. Feed water is fed to a water tank 206 and then pumped to a nanobubble generator 204 through a feed water pump 202. Hydrogen gas is injected into the nanobubble generator 204 where hydrogen nanobubbles are generated in water. The hydrogen nanobubble infused water is then returned back to the water tank 206 to form a hydrogen nanobubble infused irrigation water, that is, a HRW-nano irrigation water. In this embodiment, the HRW-nano may be i) discharged out of the water tank 206 for crop or plant irrigation and/or ii) recirculated back to the nanobubble generator 204 to provide the feed water for the nanobubble generator 204 such that the concentration of the hydrogen nanobubbles in water is increased therefrom.

Figure 3:
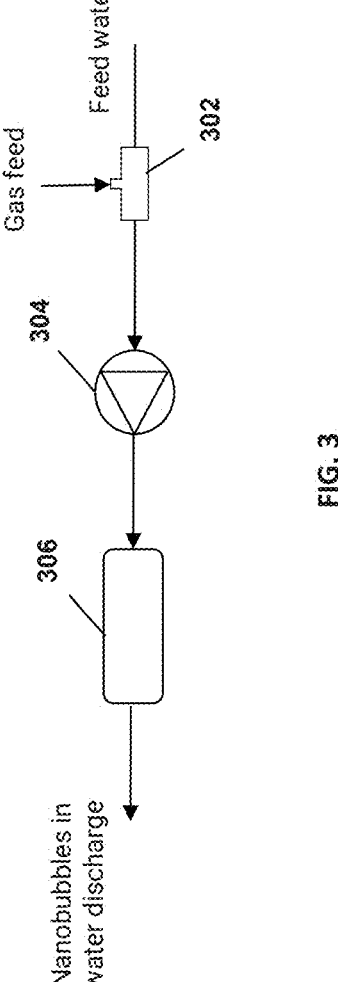
FIG. 3 is a block diagram of an exemplary embodiment of hydrogen nanobubble generation.

The hydrogen nanobubbles in water may be generated in various ways. In some embodiments, hydrogen gas is injected into a feed water through a device 302 to form a gas-liquid mixture that enters a suction port of a pump 304, as shown in FIG. 3. The device 302 may be a Venturi nozzle. The gas-liquid mixture leaving the discharge port of the pump 304 is then mixed in a mixing chamber of a nanobubble generator 306 producing the hydrogen nanobubbles in water. The hydrogen nanobubbles in water are then discharged there from. The nanobubble generator 306 may be a device that is capable of generating hydrogen nanobubbles in water with an average size of 20 to 1000 nm, preferably less than approximately 200 nm. Herein, a flow rate of hydrogen gas and a flow rate of water may be controlled to achieve optimal and consistent nanobubble sizes from the nanobubble generator 306. The average size of the produced hydrogen nanobubbles is 20 to 1000 nm, preferably less than approximately 200 nm.

Figure 4:
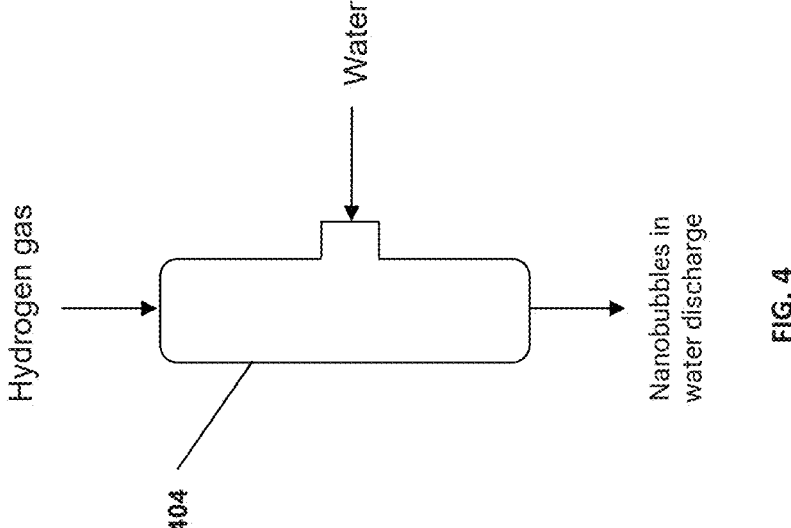
FIG. 4 is a block diagram of alternative exemplary embodiment of hydrogen nanobubble generation.

Alternatively, the hydrogen nanobubbles may be generated by a ceramic diffuser made of aluminum oxide or a mixture of aluminum oxide, titanium oxide and silicon oxide with appropriate surface coating, as shown in FIG. 4. The ceramic diffuser 404 has a pore size of between 100 to 1000 nm and may be coated with various organic compounds to create suitable surface chemistry. Water and hydrogen gas are fed to the ceramic diffuser 404, where the hydrogen nanobubbles in water is discharged therefrom. Herein, a flow rate of hydrogen gas and a flow rate of water may be controlled to achieve optimal and consistent nanobubble sizes from the nanobubble generator 404. The average size of the produced hydrogen nanobubbles is 20 to 1000 nm, preferably less than approximately 200 nm.

Figure 5:
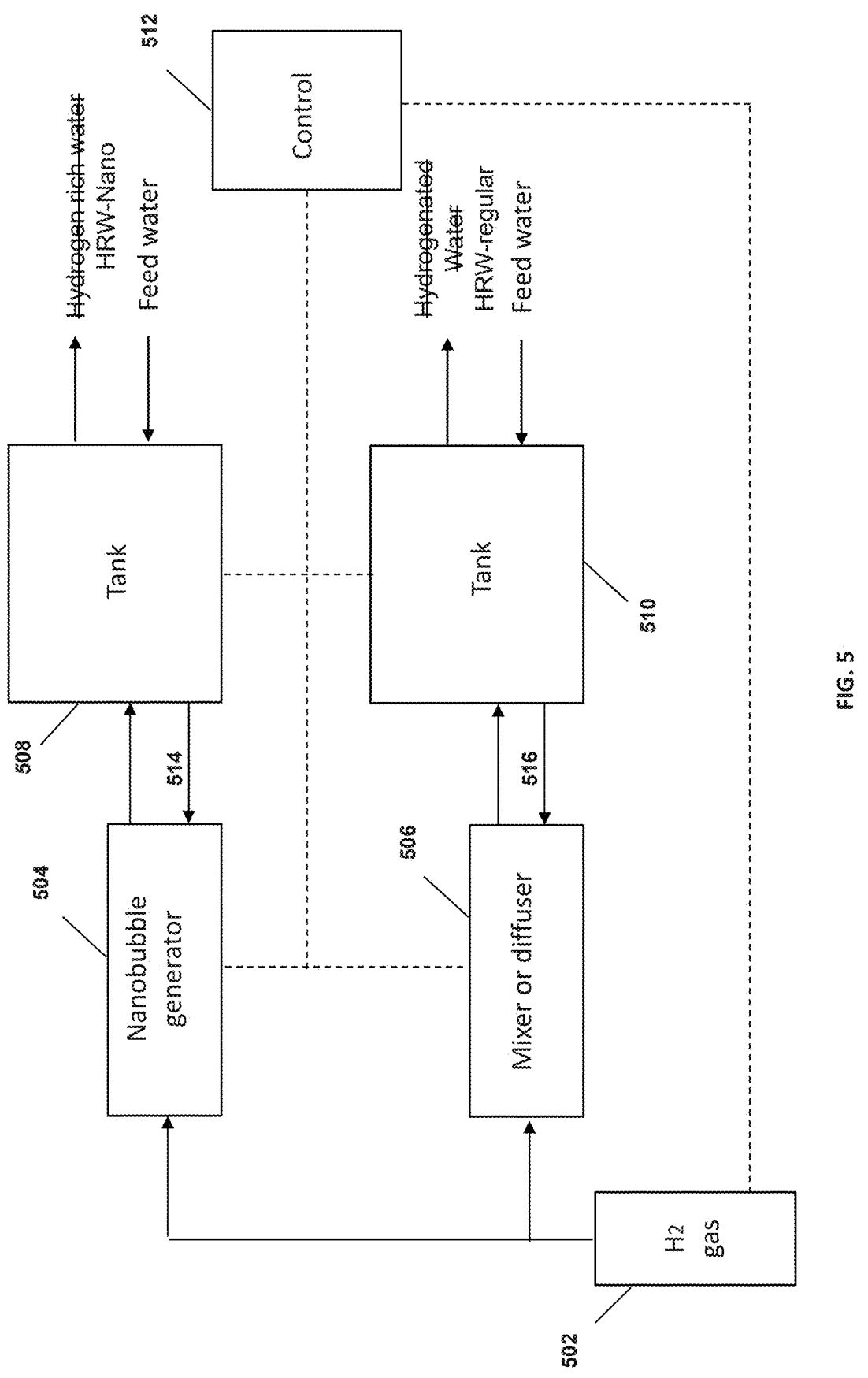
FIG. 5 is a block diagram of a HRW generation system applied to plants on open fields according to an embodiment of the present invention.

FIG. 5 is a block diagram of a HRW generation system applied to plants on open fields according to an embodiment of the present invention. The disclosed HRW generation system shown in FIG. 5 also applies to plants grown indoors, such as in a greenhouse. As shown, hydrogen gas 502 from a cylinder is injected to a nanobubble generator 504 and a gas-liquid mixer or diffuser 506, respectively. Hydrogen nanobubbles are generated in water through the nanobubble generator 504 and then returned to a water tank 508 where a hydrogen nanobubble infused irrigation water, that is, the HRW-nano. is produced as described in FIG. 1 or FIG. 2. A water-hydrogen gas mixture is formed by the liquid-gas mixer or diffuser 506 and then returned to a water tank 510 where a hydrogenated water is produced (HRW-regular). Here the mixer 506 may be static mixer. One of ordinary skill in the art would recognize that the mixer 506 may be any mixers used in the art and commercially available. The nanobubble generator 504 is a device capable of generating hydrogen nanobubbles in water with average size of 20 to 1000 nm, preferably. Both HRW-nano from tank 508 and HRW-regular from tank 510 are used for irrigation of crops or plants, such as hemp, in the open fields. The hemp yields and the concentration of the main compound CBD in hemp were measured upon harvest. In this embodiment, a Programmable Logic Controller (PLC) 512 is used to control the entire processes including hydrogen injections, hydrogen nanobubble generation, water-hydrogen gas mixture, feed water, discharges of both the HRW-nano and HRW-regular, and so on. The dashed lines in FIG. 5 show the required connections between components and the PLC 512 required for system operation. The feed water is fed to the tank 508 and tank 510, respectively, which is also controlled by the PLC 512 (not shown). The water fed to the nanobubble generator 504 and mixer or diffuser 506 are water streams 514 and 516 circulated from the tank 508 and tank 510, respectively. The irrigation using the HRW-nano. discharged from tank 508 to the hemp on the open field and the irrigation using the HRW-regular discharged from tank 510 to the hemp on the open field different from the hemp irrigated by the HRW are also controlled by the PLC 512 (not shown). The feed water used herein includes common irrigation water and/or nutrition medium, such as, fresh surface water, tap water, ground water, effluent water, wastewater already treated by a tertiary treatment process to meet irrigation requirements (e.g., California requires advanced physical-chemical treatment and extended disinfection to meet a coliform standard less than 2/100 mL), or the like. The feed water fed to the tank 508 and tank 510 may be from the same water source, or from different water sources.

EXAMPLES

The following non-limiting examples are provided to further illustrate embodiments of the invention. However, the examples are not intended to be all inclusive and are not intended to limit the scope of the inventions described herein.

A comparison of three groups of hemp plants was done on an open field with different irrigation waters. The three groups of the hemp plants are the hemp plants that irrigated with (i) a HRW generated herein with hydrogen nanobubbles, in this document identified as HRW-nano; (ii) a HRW water produced by a conventional method, such as, static mixer or a Venturi injection under atmosphere conditions in this document identified as HRW-regular; and (iii) a control water, that is, water without dissolved hydrogen (hereafter "control"), respectively.

Each group consisted of 4 rows, 50 plants per each row and at a plant spacing of 48 inches between plants and with a row spacing of 60 inches. The experiment, in total, included 12 rows and 600 plants.

Soil samples were collected from all plots pre-harvest to evaluate if the fertilization could affect the results. Soil samples were analyzed for ammonium, nitrate, phosphorus, potassium, calcium, sodium, and organic content. Minor adjustments were performed to ensure that all plots had the same properties.

For the field location, recommendations were 0.7 gallons of water per hour, per hemp plant with irrigation running 8 hours/day. During the periods of heavy rainfall, the soil moisture level was evaluated and the hemp plants were irrigated after the soil was dry.

A drip irrigation system was installed. The irrigation systems were covered with white plastic mulch to reduce weed growth.

The hemp plant seeds were planted in a greenhouse and were cultivated until the seedling developed a set of true leaves (approximately 3 weeks). The seedlings were then hand-transplanted to the field.

During the growing season, randomly selected plants were chosen for evaluation. For each condition (HRW-nano, HRW-regular, and Control), 10 randomly selected plants were selected per row (utilizing a random number generator), for a total of n=40 plants per condition. This was done for evaluation of the Average Weekly Height per Treatment, Average Weekly Chlorophyll Content per Treatment, True Leaf Count, and Average Bud Count Per Treatment.

Total Plant Height was measured by a yardstick(s) in inches.

Chlorophyll levels were measured using a SPAD-502 type meter. Measurements are taken by clamping the measuring head on the leaf. This procedure measured the nitrogen content in the plants and helped gage the health of the plants. For an indication of Growth Stage, number of days the plants acquire true leaves, secondary leaves, etc. was determined.

Growth Stage analysis determined by number of days the plants acquire true leaves, secondary leaves, etc.

After 96 days, the plants were harvested, followed by drying in a greenhouse for 3 days while flipping the plants three times a day to ensure the plants were completely dry. Total plant mass was measured by drying randomly selected samples from each group to compare total plant growth. Each plant was weighed on a calibrated scale.

Dried Floral mass (which includes buds and leaves) was then collected and ground. The dried, ground floral mass was then sent to a certified lab for THC measurement. THC was analyzed according to the method Storm, C. et al. Dedicated Cannabinoid Potency Testing for *Cannabis* or Hemp Products Using the Agilent 1220 Infinity II LC System. Agilent Technologies Application Note, Publication number 5991-9285, 2018.

Results were evaluated using standard statistical analyses methods. One-way Analysis of Variance (ANOVA) and T-test were used to determine if the difference in the data from different hemp irrigation options were significant: Control (plain irrigation water), HRW-nano, and HRW-regular. The null hypothesis is rejected if this probability is less than or equal to the significance level ($\alpha$=0.05). ANOVA test allows to test whether there is difference within all three of the treatment options. T-test was used to compare the means of Control vs HRW-regular, Control vs HRW-nano, and HRW-nano vs. HRW-regular.

Example 1: Weekly Average Height in Inches

Figure 6:
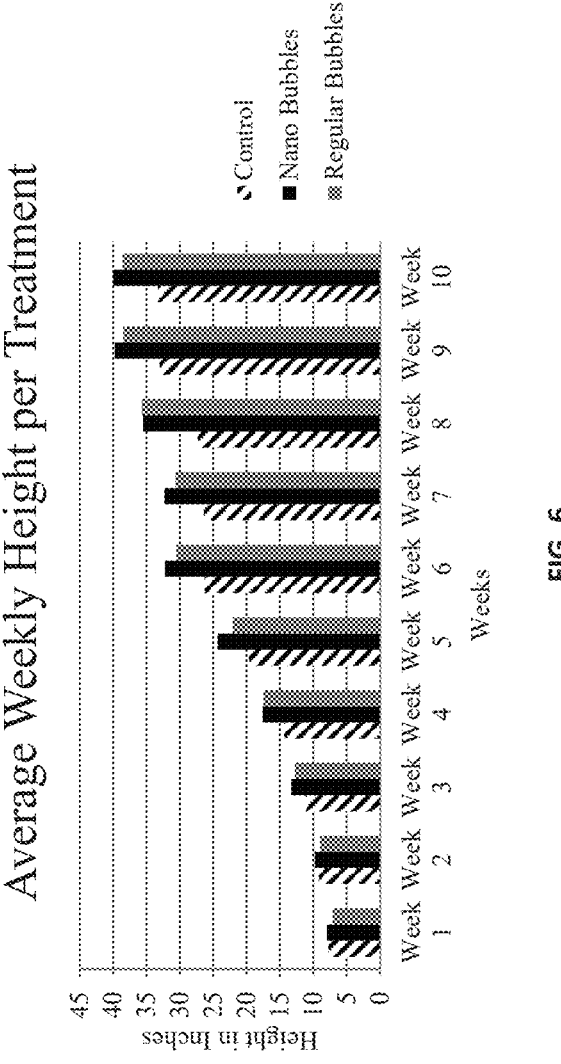
FIG. 6 is the results of weekly average height in inches of hemp.

Table 1 and FIG. 6 show the results for the Height parameter for the three groups. The results of ANOVA test for Height Parameter were statistically significant with a small effect size ($\eta2\_height$=0.026), p-value=1.08817E-07 (a s 0.05). Post hoc analysis proved statistically significant results for both treatments with the control. T-test showed there is statistical significance within two treatments. Control vs. Nano: p=2.32E-08, Control vs. Regular: p=1.89E-05. There was significant difference between HRW-nano vs. HRW-regular: p=0.22.

TABLE 1

| Weeks | Control | Nano-Bubbles | Regular-Bubbles |
|---|---|---|---|
| Week 1 | 7.75 | 7.99 | 7.09 |
| Week 2 | 9.17 | 9.76 | 8.96 |
| Week 3 | 11.09 | 13.30 | 12.75 |
| Week 4 | 14.35 | 17.59 | 17.46 |
| Week 5 | 19.63 | 24.34 | 22.08 |

TABLE 1-continued

| Weeks | Control | Nano-Bubbles | Regular-Bubbles |
|---|---|---|---|
| Week 6 | 26.27 | 32.23 | 30.50 |
| Week 7 | 26.41 | 32.31 | 30.69 |
| Week 8 | 27.30 | 35.52 | 35.70 |
| Week 9 | 33.02 | 39.75 | 38.45 |
| Week 10 | 33.26 | 39.95 | 38.62 |

Example 2: Chlorophyll Content (n=40)

Figure 7:
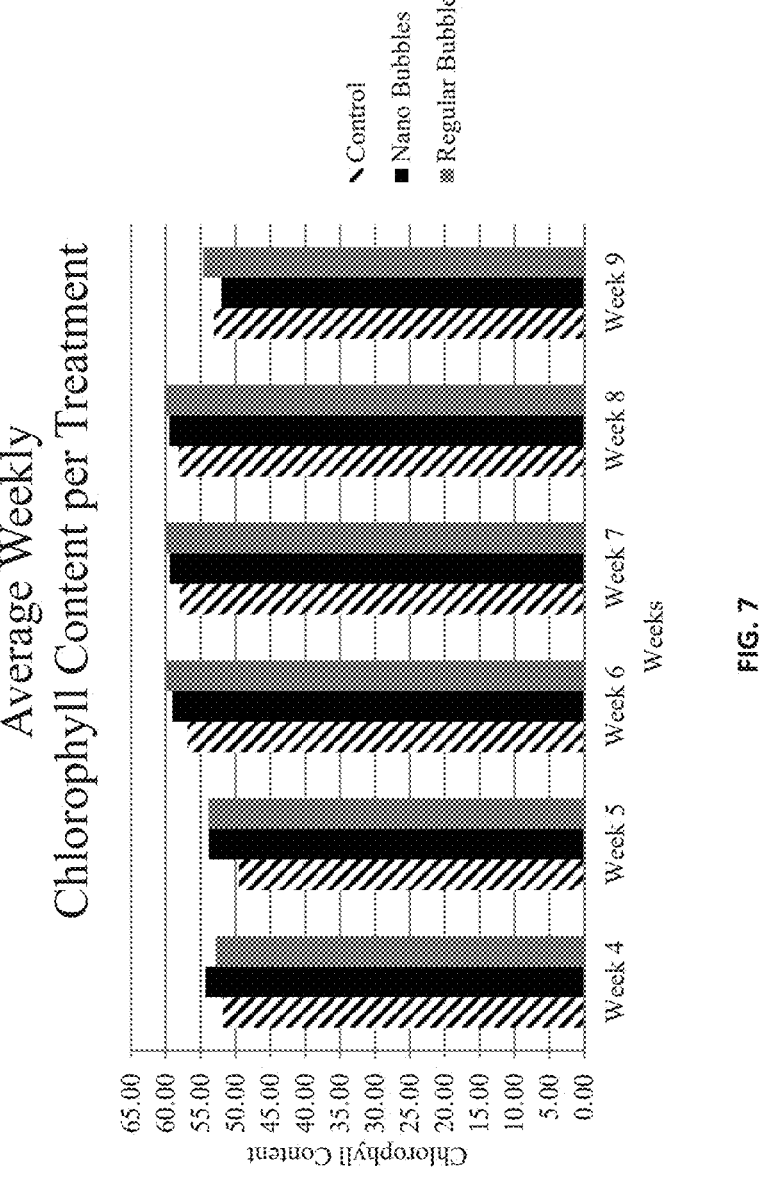
FIG. 7 is the results of average weekly chlorophyll content of hemp.

Table 2 and FIG. 7 show weekly average the Chlorophyll Content parameter (n=40). Table 3 is average chlorophyll per treatment (n=40). The results of the ANOVA for chlorophyll content were statistically significant with a small effect size ($\eta2=0.021$) and p-value=0.000462861 (a s 0.05). Post hoc analysis proved statistically significant results for both treatments with control. T-test showed there is statistical significance within two treatments: Control vs. Nano: p=0.0036 and Control vs. Regular: p=0.0002. HRW-rano vs. HRW-regular, however, was not significant: p=0.385.

TABLE 2

| Week | Control | Nano Bubbles | Regular Bubbles |
|---|---|---|---|
| Week 4 | 51.80 | 54.31 | 52.81 |
| Week 5 | 49.51 | 53.82 | 53.85 |
| Week 6 | 56.87 | 59.03 | 59.82 |
| Week 7 | 57.96 | 59.42 | 60.04 |
| Week 8 | 58.15 | 59.51 | 60.22 |
| Week 9 | 53.11 | 52.01 | 54.61 |

TABLE 3

| | Average | SD | p |
|---|---|---|---|
| Control | 54.57 | 6.67 | 4.63E−04 |
| Nano | 56.35 | 6.70 | |
| Regular | 56.89 | 6.93 | |

Example 3: True Leaves

Figure 8:
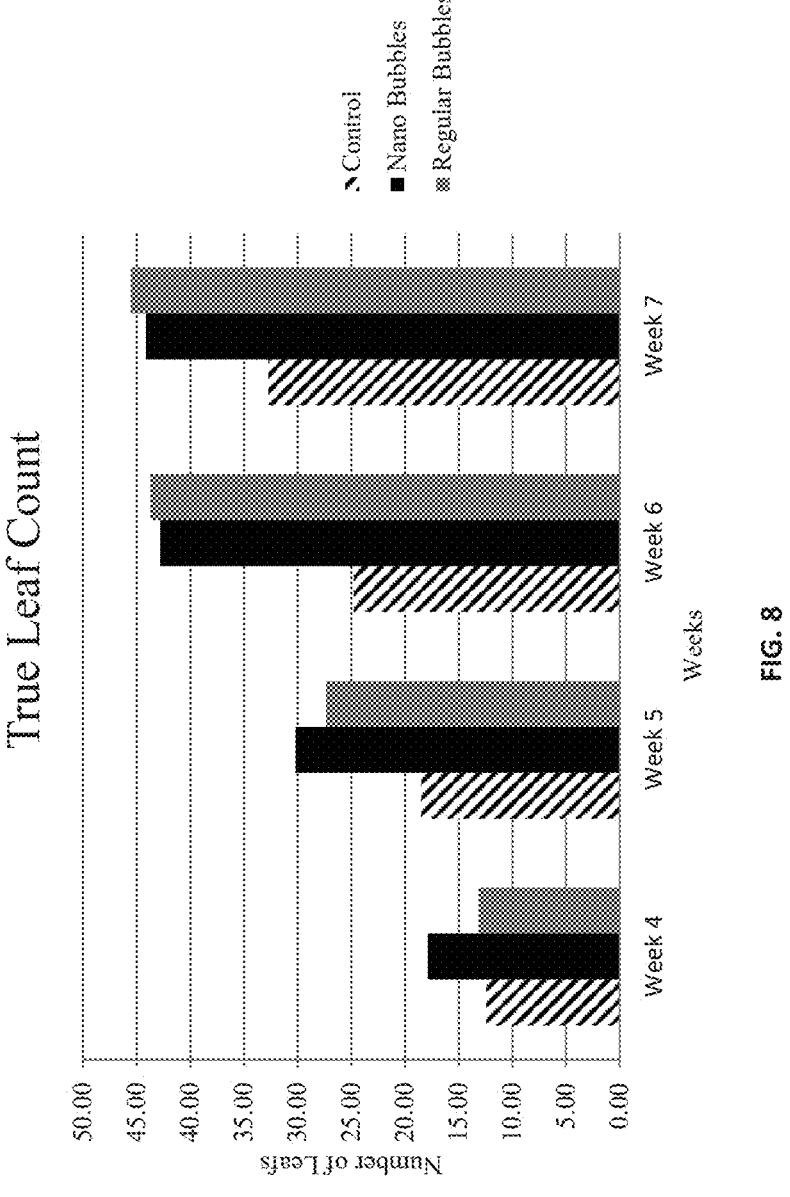
FIG. 8 is the results of weekly true leaf count per treatment of hemp.

Table 4 and FIG. 8 show weekly average true leaf count (n=40). Table 5 is average true leaves (n=40). The results of the ANOVA for the True Leaf parameter at the time of harvest were statistically significant with an effect size ($\eta2=0.3881$) with p-value=5.34E-8 (a s 0.05). Post hoc analysis proved statistically significant results for both treatments with control. T-test showed there is statistical significance within two treatments: Control vs. Nano: p=7.49E-15, Control vs. Regular: p=4.61E-11. T-Test for HRW-Nano vs. HRW-Regular showed there is no statistical significance: p=0.396.

TABLE 4

| Week | Control | Nano Bubbles | Regular Bubbles |
|---|---|---|---|
| Week 4 | 12.43 | 17.88 | 13.13 |
| Week 5 | 18.48 | 30.18 | 27.33 |
| Week 6 | 24.75 | 42.80 | 43.73 |
| Week 7 | 32.73 | 44.15 | 45.53 |

TABLE 5

| | Average | SD | p |
|---|---|---|---|
| Control | 32.73 | 14.85 | 5.34E−8 |
| Nano | 44.15 | 7.11 | |
| Regular | 45.53 | 5.89 | |

Example 4: Buds

Figure 9:
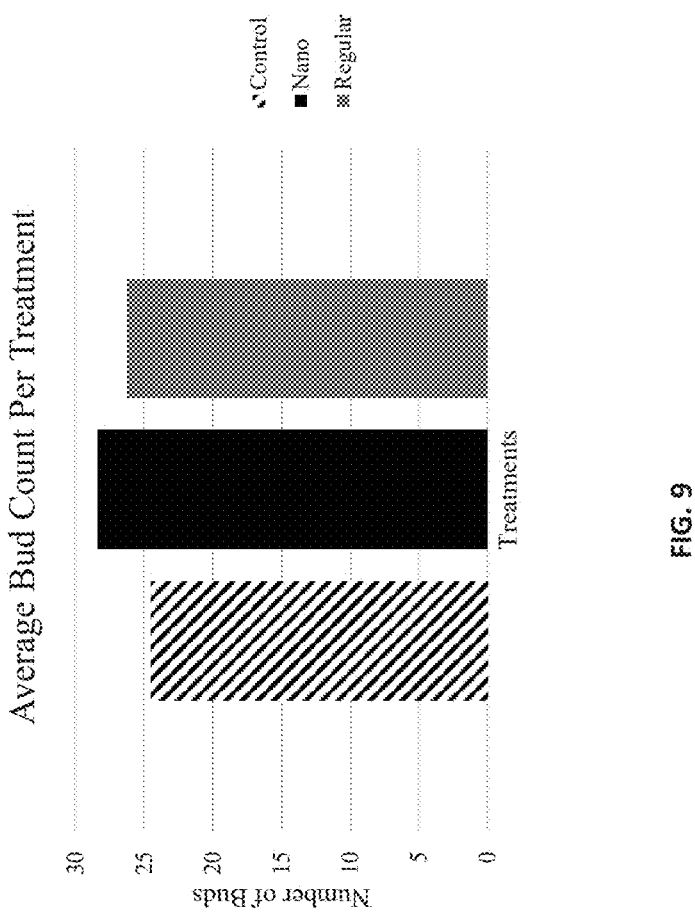
FIG. 9 is the results of bud count per treatment of hemp.

Table 6 and FIG. 9 show overall Bud Count parameters per treatment (n=40). The results of the ANOVA for Bud Count Parameter were not statistically significant with p-value=0.0723 ($\alpha>0.05$). Post hoc analysis proved statistically significant results for one treatment with control. T-test showed there is no statistical significance within two treatments: Nano vs. Regular: p=0.173 and Control vs. Regular: p=0.33. Statistical significance was for Control vs. Nano: p=0.027.

TABLE 6

| | Average | SD | p |
|---|---|---|---|
| Control | 24.53 | 8.27 | 7.23E−02 |
| Nano | 28.40 | 7.03 | |
| Regular | 26.23 | 7.13 | |

Example 5: Yield (Weight)

Figure 10:
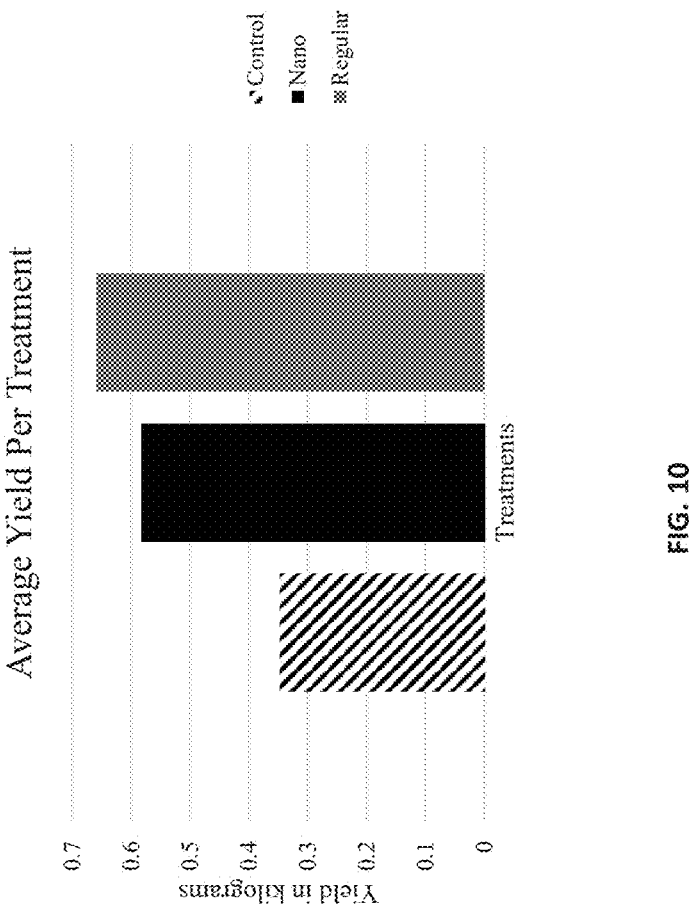
FIG. 10 is the results of average weight per treatment of hemp.

Table 7 and FIG. 10 show results the overall Yield parameters per treatment in kilograms (n=40). The results of the ANOVA for the Yield parameter were statistically significant, p=6.53E-22 ($\alpha<0.05$). Post hoc analysis proved statistically significant results for both treatments with control. T-test showed there is statistical significance within all groups: Control vs. Nano: p=1.50E-16, Control vs. Regular: p=4.79E-19, and Nano vs. Regular: p=0.012. The plants irrigated with Regular and Nano HRW had two times greater biomass yield than the Control. Of note, HRW-nano produced lower yields than HRW-regular, although still much more than the Control. This slightly inferior result for HRW-nano is contrasted with the unexpected effect on THC content described next.

TABLE 7

| | Average | SD | p |
|---|---|---|---|
| Control | 0.35 | 0.08 | 6.53E−22 |
| Nano | 0.58 | 0.12 | |
| Regular | 0.66 | 0.15 | |

Example 7: % THC

Figure 11:
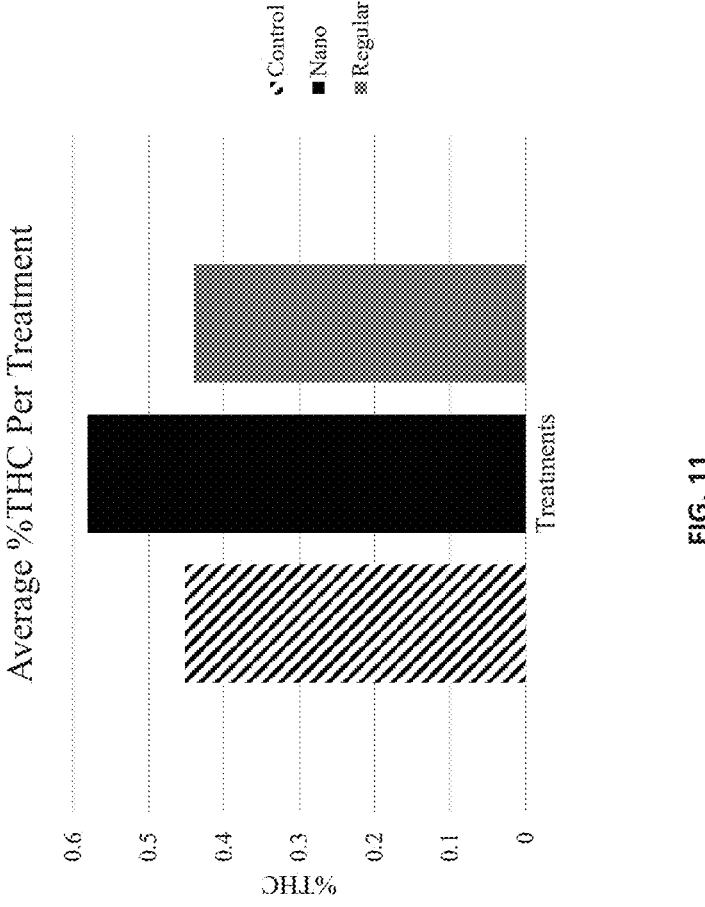
FIG. 11 is the results of total average % THC per treatment of hemp.

Table 8 and FIG. 11 show the results for the % THC parameter per Treatment (n=40). The Regular HRW treatment had the lowest % THC at 0.44. The Nano HRW treatment had the highest % THC at 0.58, which is an increase of 31.8% comparing to that of regular HRW. The results of the ANOVA for % THC Parameter were statistically significant, p=3.73E-08 ($\alpha<0.05$). Post hoc analysis proved statistically significant results for one treatment with control. T-test showed there is statistical significance within two treatments: HRW-nano vs Control: p=6.28E-06 and HRW-Nano vs. Regular: p=7.40E-06. There was no statistical significance for Control vs. Regular: p=0.15. This HRW-nano specific effect on CBD content is an unexpected difference with HRW-regular, even more surprising in view of the effect on yield weight.

TABLE 8

|  | M | SD | p |
|---|---|---|---|
| Control | 0.4511 | 0.0009 | 3.7324E−08 |
| Nano | 0.5810 | 0.0370 |  |
| Regular | 0.4398 | 0.0176 |  |

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

What is claimed is:

1. A method for irrigation of a crop capable of producing tetrahydrocannabidiol (THC), the method comprising:
  irrigating the crop with a nanobubble hydrogen rich water (HRW-nano), whereby a concentration of THC in the crop increased as a result of irrigating with the HRW-nano, compared to irrigation with an irrigation water having the same composition except without added hydrogen (control irrigation),
  wherein a concentration of dissolved hydrogen gas in the HRW-nano ranges from approximately 0.6 mg/L to approximately 1.00 mg/L.

2. The method of claim 1, further comprising the steps of pumping a feed water to a nanobubble generator; and injecting hydrogen gas into the nanobubble generator to form the hydrogen nanobubbles in water therein,
  wherein a flow rate of the hydrogen gas and a flow rate of the feed water are controlled to achieve consistent average hydrogen nanobubble sizes.

3. The method of claim 2, wherein the consistent average hydrogen nanobubble sizes range, for the maximum diameter of linear cross length distance, from approximately 20 to approximately 1000 nm.

4. The method of claim 1, wherein the concentration of dissolved hydrogen gas in the HRW-nano is approximately 0.8 mg/L (or 0.8 ppm).

5. The method of claim 1, wherein the crops are plants of the Family Cannabaceae.

6. The method of claim 1, wherein the crops are plants of the Genus *Cannabis* L.

7. The method of claim 6, wherein the concentration of tetrahydrocannabinol (THC) is increased up to approximately 32% by irrigating with the HRW-nano compared to control irrigation.

8. The method of claim 2, wherein the nanobubble generator is a device capable of producing the hydrogen nanobubbles in water with an average hydrogen nanobubble size of approximately 20 to approximately 1000 nm.

9. The method of claim 2, wherein the consistent average hydrogen nanobubble sizes range, for the maximum diameter of linear cross length distance, less than approximately 200 nm.

10. The method of claim 2, wherein the nanobubble generator is a device capable of producing the hydrogen nanobubbles in water with an average hydrogen nanobubble size of less than approximately 200 nm.

* * * * *